US009985529B2

(12) United States Patent
Chen

(10) Patent No.: US 9,985,529 B2
(45) Date of Patent: May 29, 2018

(54) POWER CONTROL METHOD AND RELATED APPARATUS CAPABLE OF PROVIDING COMPENSATION TO INDUCTANCE VARIATION

(71) Applicant: Leadtrend Technology Corporation, Zhubei, Hsinchu County (TW)

(72) Inventor: Chi-Pin Chen, Zhubei (TW)

(73) Assignee: LEADTREND TECHNOLOGY CORPORATION, Zhubei, Hsinchu County (TW)

( * ) Notice: Subject to any disclaimer, the term of this patent is extended or adjusted under 35 U.S.C. 154(b) by 0 days. days.

(21) Appl. No.: 15/331,459

(22) Filed: Oct. 21, 2016

(65) Prior Publication Data
US 2017/0126132 A1 May 4, 2017

(30) Foreign Application Priority Data

Oct. 30, 2015 (TW) .............................. 104135759 A

(51) Int. Cl.
| H02M 3/335 | (2006.01) |
| H02M 3/24 | (2006.01) |
| H02M 1/08 | (2006.01) |
| H02M 1/32 | (2007.01) |
| H02M 1/00 | (2006.01) |

(52) U.S. Cl.
CPC .............. *H02M 3/24* (2013.01); *H02M 1/08* (2013.01); *H02M 1/32* (2013.01); *H02M 2001/0009* (2013.01)

(58) Field of Classification Search
CPC ......... H02M 3/33515; H02M 3/33523; H02M 2001/0009; H02M 1/08; H02M 1/16; Y02B 70/1491

USPC .............. 363/21.02–21.18, 49, 56.06, 16–17
See application file for complete search history.

(56) References Cited

U.S. PATENT DOCUMENTS

| 5,757,627 A * | 5/1998 | Faulk ................. | H02M 3/33576 363/21.14 |
| 8,213,192 B2 * | 7/2012 | Konecny ........... | H02M 3/33515 363/21.13 |
| 8,222,882 B2 * | 7/2012 | Balakrishnan .... | H02M 3/33507 323/283 |
| 8,599,581 B2 * | 12/2013 | Huang .............. | H02M 3/33523 363/21.12 |
| 8,605,462 B2 * | 12/2013 | Yang .................. | H02M 3/3376 363/21.02 |
| 9,401,648 B2 * | 7/2016 | Li ..................... | H02M 3/33507 |
| 2014/0153297 A1 * | 6/2014 | Balakrishnan .... | H02M 3/33507 363/21.18 |

* cited by examiner

*Primary Examiner* — Rajnikant Patel
(74) *Attorney, Agent, or Firm* — McClure, Qualey & Rodack, LLP

(57) ABSTRACT

A power supply control method capable of compensating inductance variation of an inductive device in a power supply. The power supply has a power switch controlling a winding current through the inductive device, and converts an input voltage into an output voltage. A sampling time is provided within an ON time of the power switch. The sampling time has a length substantially independent from the ON time, the input voltage, and an inductance of the inductive device. A current-sense signal, a representative of the winding current, is sampled to hold a sample voltage after the sampling time. The power switch is controller in response to the sample voltage so as to make the output voltage comply with an output rating.

19 Claims, 5 Drawing Sheets

POWER CONTROL METHOD AND RELATED APPARATUS CAPABLE OF PROVIDING COMPENSATION TO INDUCTANCE VARIATION

CROSS-REFERENCE TO RELATED APPLICATION

This application claims priority to and the benefit of Taiwan Application Series Number 104135759 filed on Oct. 30, 2015, which is incorporated by reference in its entirety.

BACKGROUND

The present disclosure relates generally to a power controllers and related power supply control methods, especially to automatic compensation to inductance variation of an inductive device in a power supply.

Electronic devices usually need a power supply capable of providing a power source with output ratings such as maximum output current, maximum output voltage, or maximum output power. Switching-mode power supplies (SMPS), due to excellent conversion rate, simple topology, and compact product size, are popularly adapted by electronic apparatuses.

A power supply, if properly designed, needs protection mechanism to avoid risk from happening due to accident or disoperation. For instance, protection mechanism could include over temperature protection (OTP), over voltage protection (OVP), over current protection OCP), over power protection (OPP), output short protection (OSP), and so forth. OTP refers to the protection provided when the temperature of a power supply is over high. OVP deals with the operation when the output voltage of a power supply exceeds a limit. OCP and OPP limit the output current and the output power of a power supply to be under designed ratings. OSP involves the protection when an output voltage of a power supply is clamped to be 0V.

The implementation of OCP or OPP of a SMPS normally relies on the detection of a winding current through an inductive device in the SMPS. FIG. 1 demonstrates the waveform of a current-sense signal $V_{CS}$ generated by sensing a winding current of an inductive device in a SMPS. In view of OCP and OPP, the current-sense signal $V_{CS}$ is expected to be limited under a signal $V_{CS\text{-}LIMIT}$, which might be a predetermined value or a variable depending on a compensation voltage reflecting a load of a SMPS. In reality, signal propagation delay could cause nevertheless a peak $V_{CS\text{-}PEAK}$ of the current-sense signal $V_{CS}$ much higher than the signal $V_{CS\text{-}LIMIT}$, as shown in FIG. 1. A time delay $T_D$ occurs for a circuit to conclude an ON time $T_{ON}$ of a power switch after finding that the current-sense signal $V_{CS}$ exceeds the signal $V_{CS\text{-}LIMIT}$, and the current-sense signal $V_{CS}$, due to its inertia, still goes upward during this time delay $T_D$. Therefore, the peak $V_{CS\text{-}PEAK}$ finally resulted is different from the signal $V_{CS\text{-}LIMIT}$ by a gap $\Delta V_{CS}$, whose magnitude depends on the value of an input voltage of the SMPS, the inductance of the inductive device, and the time delay $T_D$. Inductance variation of the inductive device, even though allowable or tolerable in mass production, could generate different peaks $V_{CS\text{-}PEAK}$, and easily cause inaccuracy or uncertainty to the conditions for triggering OCP and OPP.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified. These drawings are not necessarily drawn to scale. Likewise, the relative sizes of elements illustrated by the drawings may differ from the relative sizes depicted.

The invention can be more fully understood by the subsequent detailed description and examples with references made to the accompanying drawings, wherein.

DETAILED DESCRIPTION

Figure 1:
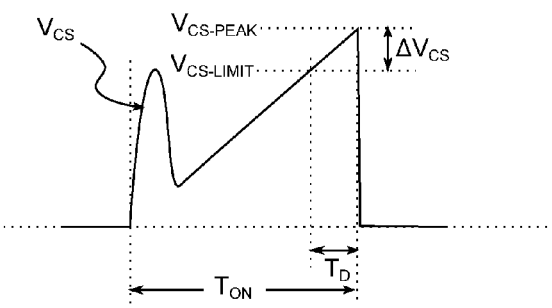
FIG. 1 demonstrates the waveform of a current-sense signal $V_{CS}$ generated by sensing a winding current of an inductive device in a SMPS.
Figure 2:
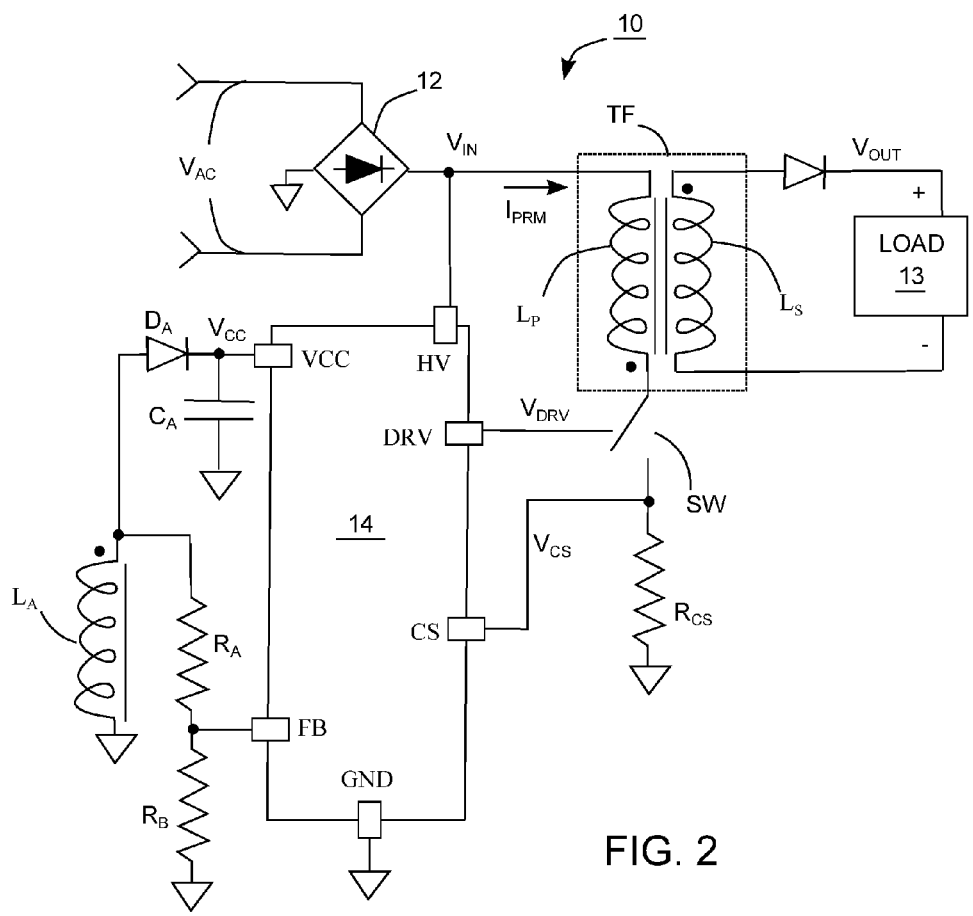
FIG. 2 demonstrates a switching-mode power supply according to embodiments of the invention.

FIG. 2 demonstrates a switching-mode power supply 10 according to embodiments of the invention, capable of automatically compensating the inductance variation and making OCP and OPP trigger more accurately. The SMPS 10 has a flyback topology, but this invention is not limited to however. For instance, other embodiments of the invention could be boosters, buck converters, or buck boosters.

The SMPS 10 is mainly powered by a mains power supply providing an alternating-current (AC) voltage $V_{AC}$. A bridge rectifier 12 rectifies the AC voltage $V_{AC}$ to generate a DC input voltage $V_{IN}$, which could be substantially stable at a certain voltage value or vary overtime to have an M-shaped waveform. The SMPS 10 converts the input voltage $V_{IN}$ into an output voltage $V_{OUT}$ to power a load 13. A transformer TF, as an inductive device, includes a primary winding $L_P$, a secondary winding $L_S$ and an auxiliary winding $L_A$, inductively coupled to one another. A power switch SW is connected in series with the primary winding $L_P$ and a current-sense resistor $R_{CS}$ between the input voltage $V_{IN}$ and a primary-side ground connected to the bridge rectifier 12. A power controller 14 senses the winding current $I_{PRM}$ through the primary winding $L_P$ by detecting the current-sense voltage $V_{CS}$ over the current-sense resistor $R_{CS}$. In other words, the current-sense voltage $V_{CS}$ is a representative of the winding current $I_{PRM}$. The power controller 14 provides a driving signal $V_{DRV}$ at a driving node DRV to turn ON or OFF the power switch SW. The power controller 14 has a high-voltage node HV connected to the input voltage $V_{IN}$. When the transformer TF de-energizes, the auxiliary winding $L_A$ provides current to charge a capacitor $C_A$ and build up an operating voltage $V_{CC}$ as a power source of the power controller 14. At the same time, the secondary winding $L_S$ de-energizes to build up the output voltage $V_{OUT}$. Resistors $R_A$ and $R_B$ are connected in series, and the joint between them is connected to a feedback node FB of the power controller 14.

Figure 3:
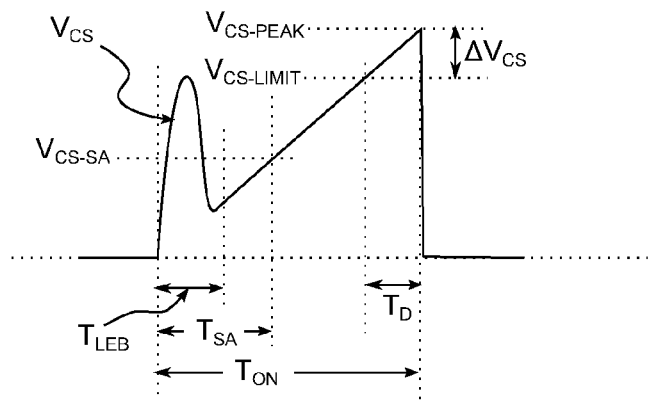
FIG. 3 demonstrates sampling the current-sense signal $V_{CS}$ during a sampling time $T_{SA}$ to hold a sample voltage $V_{CS\text{-}SA}$ after the end of the sampling time $T_{SA}$.

FIG. 3 demonstrates sampling the current-sense signal $V_{CS}$ during a sampling time $T_{SA}$ to hold a sample voltage $V_{CS-SA}$ after the sampling time $T_{SA}$, while a leading-edge-blanking (LEB) time $T_{LEB}$ is also denoted in FIG. 3. The power controller 14 provides the sampling time $T_{SA}$ and the LEB time $T_{LEB}$, both starting simultaneously with the beginning of an ON time $T_{ON}$ of the power switch SW, where an ON time $T_{ON}$ refers to one period of time when the power switch SW is turned ON. The Length of the sampling time $T_{SA}$ is predetermined to be substantially independent from the ON time $T_{ON}$, the input voltage $V_{IN}$ and the inductance of the primary winding $L_P$. During the LEB time $T_{LEB}$, the power controller 14 keeps the power switch SW ON irrespective of the current-sense signal $V_{CS}$. The LEB time $T_{LEB}$ ends earlier in a switching cycle than the sampling time $T_{SA}$ does, as shown in FIG. 3, where a switching cycle includes one ON time $T_{ON}$ and one OFF time $T_{OFF}$ of the power switch SW.

To facilitate analyzation, FIG. 2 is also copied in FIG. 3. The gap $\Delta V_{CS}$ and the sample voltage $V_{CS-SA}$ can be derived by the following equations (1A) and (1B) respectively.

$$\Delta V_{CS} = V_{IN}/LP \times T_D \times R_{CS} \tag{1A}$$

$$V_{CS-SA} = V_{IN}/LP \times T_{SA} \times R_{CS} \tag{1B}$$

where LP is the inductance of the primary winding $L_P$.

Shown in the equation (1B), the sample voltage $V_{CS-SA}$ contains information of both the line voltage $V_{IN}$ and the inductance LP. Should the line voltage $V_{IN}$ be removed from the sample voltage $V_{CS-SA}$ resulted information could be related only to the inductance LP, and it can be used to modify the triggering conditions for OCP and OPP, making OCP and OPP more accurate.

Figure 4:
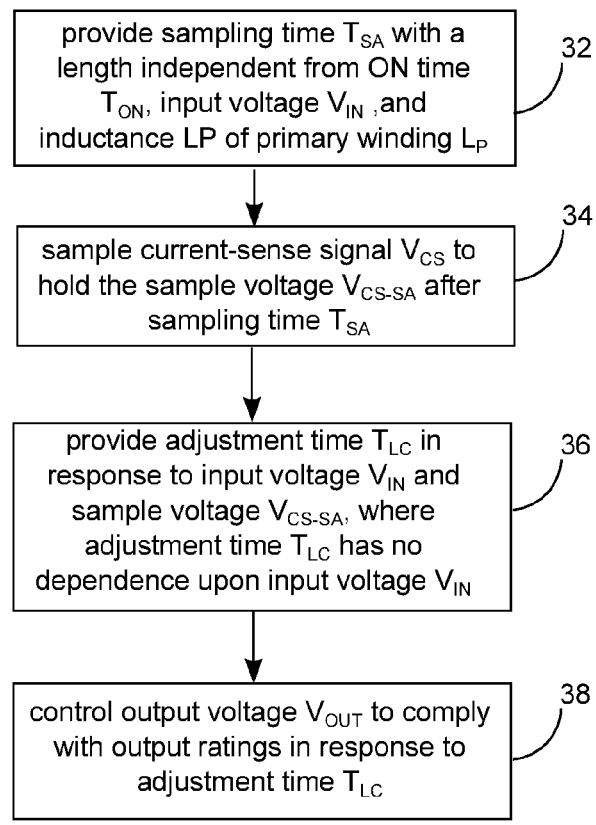
FIG. 4 shows a power supply control method according to embodiments of the invention.

FIG. 4 shows a power supply control method according to embodiments of the invention, suitable for use in the power controller 14 of the switching-mode power supply 10 in FIG. 2. Step 32 provides the sampling time $T_{SA}$ with a length substantially independent from an ON time $T_{ON}$, the input voltage $V_{IN}$ and the inductance LP of the primary winding $L_P$. Step 34 samples the current-sense signal $V_{CS}$ to hold the sample voltage $V_{CS-SA}$ after the sampling time $T_{GA}$. Step 36, which could start at the beginning of an OFF time $T_{OFF}$, provides an adjustment time $T_{LC}$ in response to the input voltage $V_{IN}$ and the sample voltage $V_{CS-SA}$, where the OFF time $T_{OFF}$ refers to a period of time when the power switch SW is turned OFF. In one perspective, step 36 removes the input voltage $V_{IN}$ from the sample voltage $V_{CS-SA}$ to provide the adjustment time $T_{LC}$, which has dependence upon the inductance LP, but not upon the input voltage $V_{IN}$. As the time delay $T_D$, which depends on the implemented circuit in a final product, is about a constant, it will be proved later that the adjustment time $T_{LC}$ substantially depends only on the inductance LP. Step 38 controls, in response to the adjustment time $T_{LC}$, the output voltage $V_{OUT}$ to comply output ratings, such as a maximum output current and a maximum output power of the output voltage $V_{OUT}$. The adjustment time $T_{LC}$ could be used for compensating the impact of inductance variation upon the output ratings, making the output ratings substantially independent from the inductance $L_P$.

Figure 5:
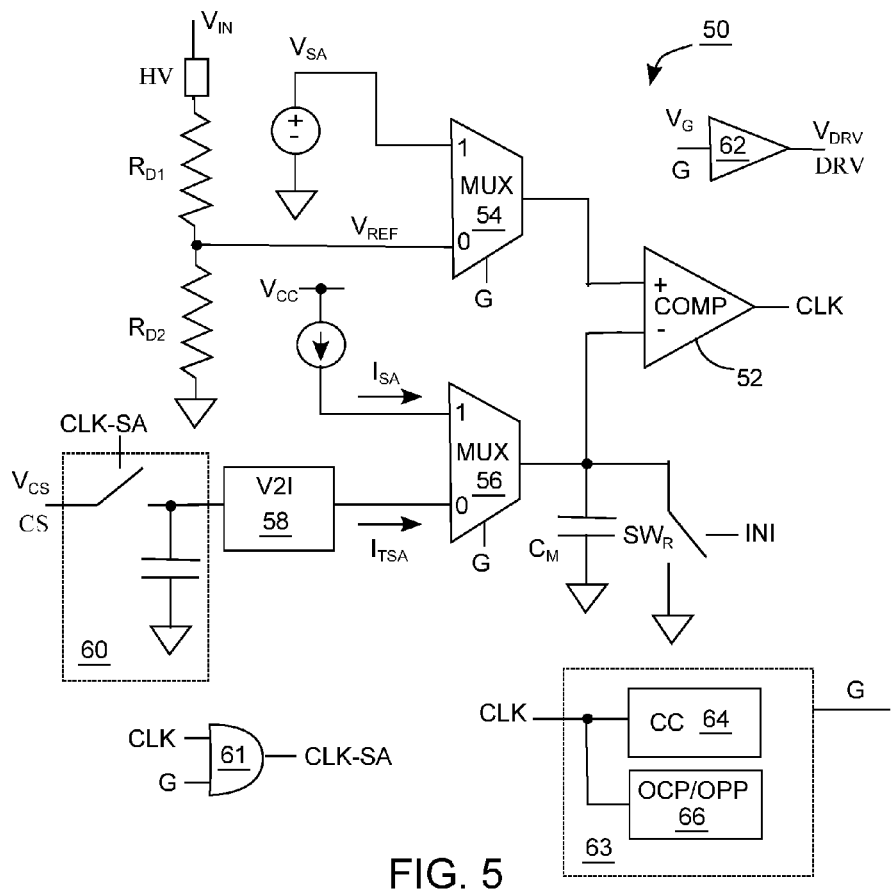
FIG. 5 demonstrates a control circuit suitable for use in a power controller.

FIG. 5 demonstrates a control circuit 50 suitable for use in the power controller 14 and capable of performing the steps of the power supply control method shown in FIG. 4. The control circuit 50 has a comparator 52, a capacitor $C_M$, a reset switch $SW_R$, multiplexers 54 and 56, resistors $R_{D1}$ and $R_{D2}$, a voltage-to-current converter 58, a sample-and-hold circuit 60, AND gate 61, a driver 62, and an output rating control unit 63.

The driver 62 amplifies a gate signal $V_G$ at the node G to become a driving signal $V_{DRV}$, which via the node DRV turns ON or OFF the power switch SW in FIG. 2. The driving signal $V_{DRV}$ is equivalent to the gate signal $V_G$ at the node G in view of the logic value. When the driving signal $V_{DRV}$ has a logic value of "1", the power switch SW is ON; when the driving signal $V_{DRV}$ has a logic value of "0", the power switch SW is OFF.

The multiplexer 54, based upon the present logic value of the gate signal $V_G$, selects one of a predetermined voltage $V_{SA}$ and a reference voltage $V_{REF}$ to be connected to a non-inverted input of the comparator 52. During an ON time $T_{ON}$, it is the predetermined voltage $V_{SA}$ that is selected by the multiplexer 54. During an OFF time $T_{OFF}$, the reference voltage $V_{REF}$ is selected by the multiplexer 54. Please note that the reference voltage $V_{REF}$ is generated by dividing the input voltage $V_{IN}$, using a divider composed of the resistors $R_{D1}$ and $R_{D2}$. So the reference voltage $V_{REF}$ is in proportion to the input voltage $V_{IN}$, or it is a representative of the input voltage $V_{IN}$.

Similarly, the multiplexer 56, based upon the present logic value of the gate signal $V_G$, selects one of a predetermined constant current $I_{SA}$ and an exemplary current $I_{TSA}$ to charge the capacitor $C_M$, which is connected to an inverted input of the comparator 52. The constant current $I_{SA}$ is generated from a constant current source, while the exemplary current $I_{TSA}$ is generated by the voltage-to-current converter 58. During an ON time $T_{ON}$, it is the constant current $I_{SA}$ that is selected by the multiplexer 56. During an OFF time $T_{OFF}$, it turns out to be the exemplary current $I_{TSA}$ that is selected by the multiplexer 56.

The comparator 52 has a node CLK for output. The AND gate 61 has the nodes G and CLK as its inputs and the node CLK-SA as its output to control the sample-and-hold circuit 60. The node CLK is also connected to the output rating control unit 63.

When the signal at the node CLK-SA is "1" in logic, the sample-and-hold circuit 60 samples the current-sense signal $V_{CS}$ which is fed directly to a capacitor in the sample-and-hold circuit 60. When the signal at the node CLK-SA is "0" in logic, the connection between the capacitor and the current-sense node CS is open, so the sample-and-hold circuit 60 holds at one end of the capacitor the sample voltage $V_{CS-SA}$ as a sampling result.

The voltage-to-current converter 58 converts the sample voltage $V_{CS-SA}$ into the exemplary current $I_{TSA}$, which charges the capacitor $C_M$ during an OFF time $T_{OFF}$ of the power switch SW.

In order to fit the output ratings that a SMPS is designed for, the output rating control unit 63 controls the gate signal $V_G$ at the node G in response to the signal at the node CLK. In other words, the output rating control unit 63 controls the output voltage $V_{OUT}$ to comply with the output ratings. The output rating control unit 63 has for example a maximum output-current control unit 64 for limiting the output current of the output voltage $V_{OUT}$ under a maximum output current, and an OCP/OPP unit 66 for temporarily shutting down the switching mode power supply 10 of FIG. 2 several seconds after the output current or power of the output voltage $V_{OUT}$ has been found to exceed a predetermined maximum output current/power. The signal at the node CLK affects at least one of the output ratings such as the maximum output current and the maximum output power of the output voltage $V_{OUT}$.

Figure 6A:
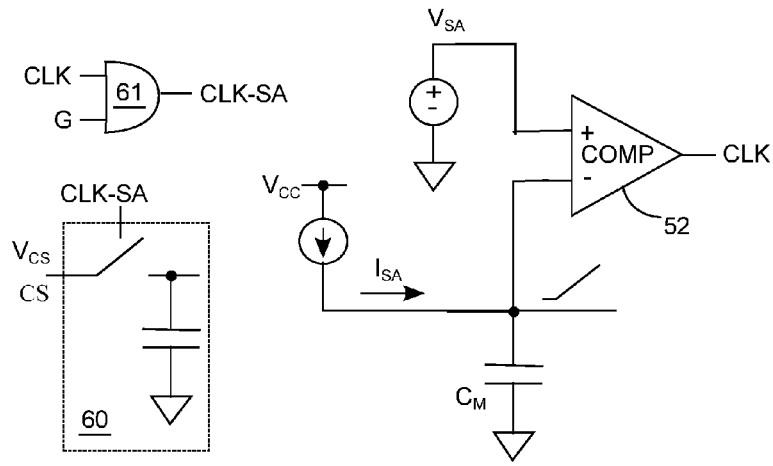
FIG. 6A illustrates a simplified version of the control circuit of FIG. 5 during an ON time $T_{ON}$, and FIG. 6B another simplified version during an OFF time $T_{OFF}$.
Figure 6B:
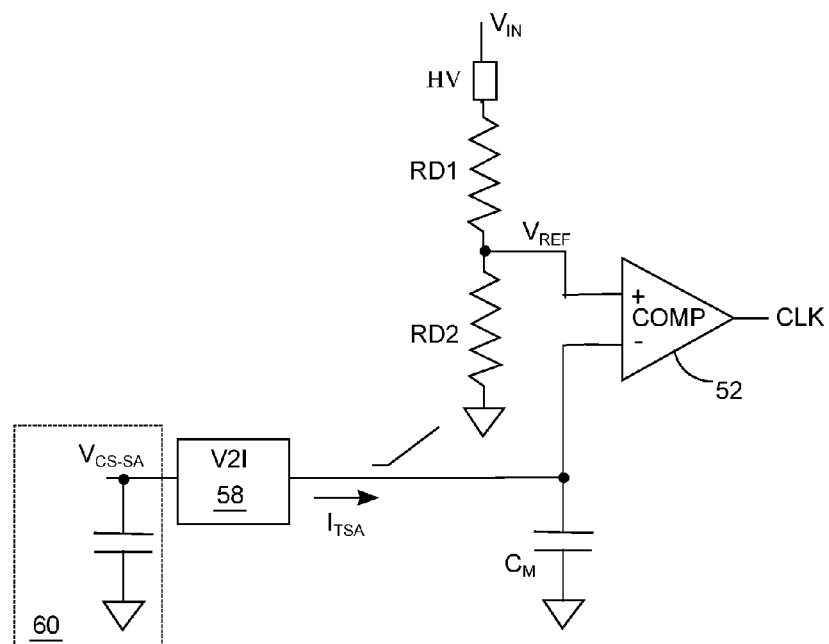
Figure 7:
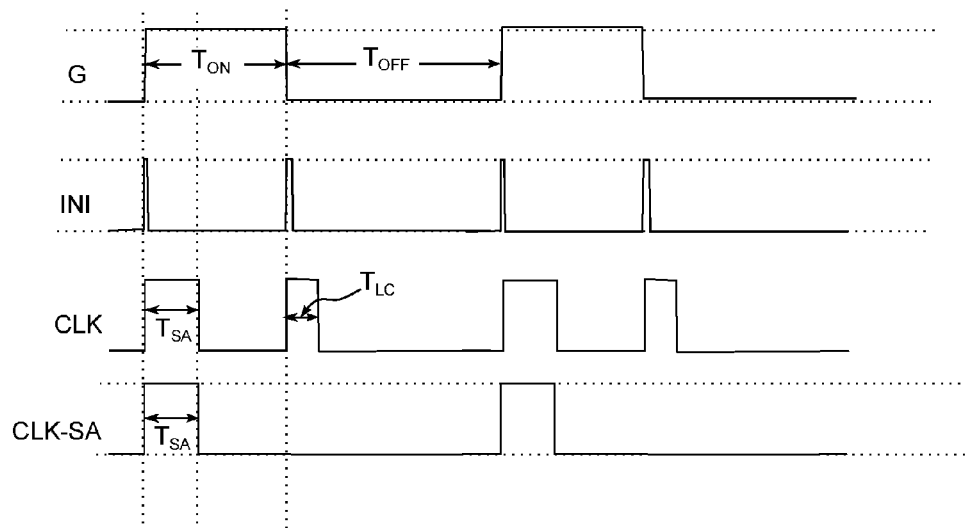
FIG. 7 shows waveforms of the signals at the nodes G, INI, CLK, and CLK-SA respectively.

FIG. 6A illustrates a simplified version of the control circuit 50 during an ON time $T_{ON}$, and FIG. 6B another simplified version during an OFF time $T_{OFF}$. FIG. 7 shows waveforms of the signals at the nodes G, INI, CLK, and CLK-SA respectively.

Shown in FIG. 7, whenever the gate signal $V_G$ at the node G toggles the power switch SW, changing its state from ON to OFF, or from OFF to ON, a short pulse at the node INI occurs to reset the capacitor $C_M$.

Please refer to FIGS. 5, 6A, and 7. At the beginning of an ON time $T_{ON}$, a short pulse at the node INI resets the capacitor $C_M$ by momentarily turning the reset switch $SW_R$ ON, shorting two ends of the capacitor $C_M$ to each other, and making the capacitor voltage of the capacitor $C_M$ about 0V. As the capacitor voltage becomes 0V, the comparator 52 makes the logic value of the signal at the node CLK "1", causing the constant current $I_{SA}$ to charge the capacitor $C_M$. The capacitor voltage of the capacitor $C_M$ starts rising after the short pulse for the resetting ends.

Both the logic values at the nodes CLK and CLK-SA change into "0" when the capacitor voltage of the capacitor $C_M$ exceeds the predetermined voltage $V_{SA}$. As demonstrated in FIG. 7, the sampling time $T_{SA}$ is the period of time when the signal at the node CLK-SA has a logic value of "1". The sampling time $T_{SA}$ is concluded when the capacitor voltage of the capacitor $C_M$ exceeds the predetermined voltage $V_{SA}$. Please note that the length of the sampling time $T_{SA}$ is determined based on the combination of the constant current $I_{SA}$, the predetermined voltage $V_{SA}$, and the capacitor $C_M$, all having nothing to do with the ON time $T_{ON}$, the input voltage $V_{IN}$ and the primary winding $L_P$. The length of the sampling time $T_{SA}$, therefore, is independent from the ON time $T_{ON}$, the input voltage $V_{IN}$ and the inductance of the primary winding $L_P$.

After the end of the sampling time $T_{SA}$, the sample-and-hold circuit 60 disconnects the voltage-to-current converter 58 from the current-sense node CS, holds the sample voltage $V_{CS\text{-}SA}$, and forwards the sample voltage $V_{CS\text{-}SA}$ to the voltage-to-current converter 58. The length of the sampling time $T_{SA}$ and the voltage value of the sample voltage $V_{CS\text{-}SA}$ can be obtained from the following equations (2) and (3) respectively.

$$T_{SA} = \frac{CM \times V_{SA}}{I_{SA}}, \text{ and} \qquad (2)$$

$$V_{CS-SA} = \frac{V_{IN}}{LP} \times T_{SA} \times R_{CS} = \frac{V_{IN}}{LP} \times \frac{CM \times V_{SA}}{I_{SA}} \times R_{CS}, \qquad (3)$$

where CM refers to the capacitance of the capacitor $C_M$.

Please refer to FIGS. 5, 6B, and 7. At the beginning of an OFF time $T_{OFF}$, another short pulse at the node INI resets the capacitor $C_M$, making the logic value of the signal at the node CLK "1" and causing the exemplary current $I_{TSA}$ from the voltage-to-current converter 58 to charge the capacitor $C_M$, as shown in FIG. 6B. The capacitor voltage of the capacitor $C_M$ starts rising after the short pulse for this resetting ends.

The logic value at the node CLK changes into "0" when the capacitor voltage of the capacitor $C_M$ exceeds the reference voltage $V_{REF}$. As denoted in FIG. 7, the adjustment time $T_{LC}$ is the period of time when the signal at the node CLK, during the OFF time $T_{OFF}$, has a logic value of "1". The adjustment time $T_{LC}$ is concluded when the capacitor voltage of the capacitor $C_M$ exceeds the reference voltage $V_{REF}$. The length of the adjustment time $T_{LC}$ could be derived from the following equation (4).

$$T_{LC} = \frac{CM \times V_{REF}}{I_{TSA}} = \qquad (4)$$

$$\frac{CM \times V_{REF}}{GM \times V_{CS-SA}} = \frac{CM \times V_{REF}}{GM} \times \frac{LP \times I_{SA}}{V_{IN} \times CM \times V_{SA} \times R_{CS}}$$

$$T_{LC} = \frac{V_{REF}}{GM} \times \frac{LP \times I_{SA}}{V_{IN} \times V_{SA}} = \frac{K2}{GM} \times \frac{1}{R_{CS}} \times \frac{LP \times I_{SA}}{V_{SA}},$$

where GM is the conversion factor or the transconductance of the voltage-to-current converter 58, and K2 the ratio of the reference voltage $V_{REF}$ to the input voltage $V_{IN}$.

The final result of the equation (4) does not have the capacitance CM, meaning the adjustment time $T_{LC}$ has no dependence upon the capacitance CM. In other words, the capacitance CM, which might vary due to process variation, has no impact to the adjustment time $T_{LC}$, as it disappears in the final result of the equation (4), a benefit generated from the usage of a single capacitor $C_M$ for determining both the sampling time $T_{SA}$ and the adjustment time $T_{LC}$.

Furthermore, the final result of the equation (4) shows the adjustment time $T_{LC}$ also has no dependence upon the input voltage $V_{IN}$. The input voltage $V_{IN}$ and the reference voltage $V_{REF}$ eliminate each other in the final result because the reference voltage $V_{REF}$ is in proportion to the input voltage $V_{IN}$. In the equation (4), GM, K2, $I_{SA}$, $R_{CS}$ and $V_{SA}$ all are predetermined to be constant in a power supply system, so the adjustment time $T_{LC}$ merely depends on the inductance LP of the primary winding $L_P$. More specifically, the adjustment time $T_{LC}$ is in proportion to the inductance LP, as shown in the equation (4).

Shown in FIG. 5, the node CLK, capable of providing the adjustment time $T_{LC}$, is connected to the output rating control unit 63 with the maximum output-current control unit 64 and the OCP/OPP unit 66. The output ratings defined by the maximum output-current control unit 64 and the OCP/OPP unit 66 could be modified by the adjustment time $T_{LC}$ indicated by the signal at the node CLK, so as to compensate the inductance variation of the primary winding $L_P$. For instant, without compensating the inductance variation of the primary winding $L_P$, performance measurement of an SMPS in the prior art could find a negative correlation between the maximum output current of the output voltage $V_{OUT}$ (achieved under the control of an output rating control unit) and the inductance LP of the primary winding $L_P$. Based on this finding, the maximum output-current control unit 64 according to embodiments of the invention could be designed to compensate the inductance variation of the primary winding $L_P$ by modifying a control parameter corresponding to that maximum output current to have a positive correlation to the length of the adjustment time $T_{LC}$. The control parameter slightly increases if the adjustment time $T_{LC}$ lengthens, and it slightly decreases if the adjustment time $T_{LC}$ shortens, for example. Then, it is possible to make the maximum output current substantially independent to the inductance variation of the primary winding $L_P$, because that positive correlation and that negative correlation could just eliminate each other.

Figure 8A:
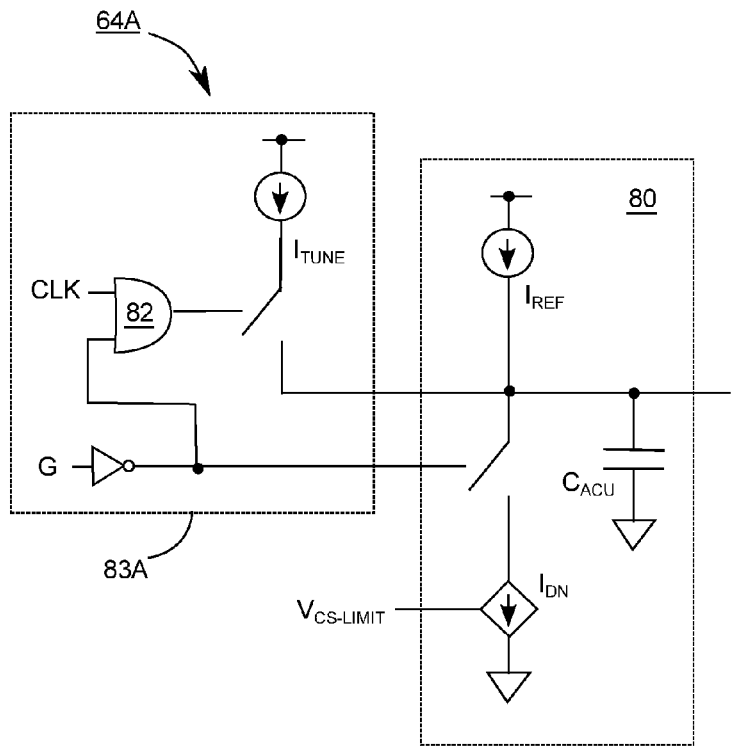
FIGS. 8A and 8B demonstrate two maximum output-current control units and respectively.
Figure 8B:
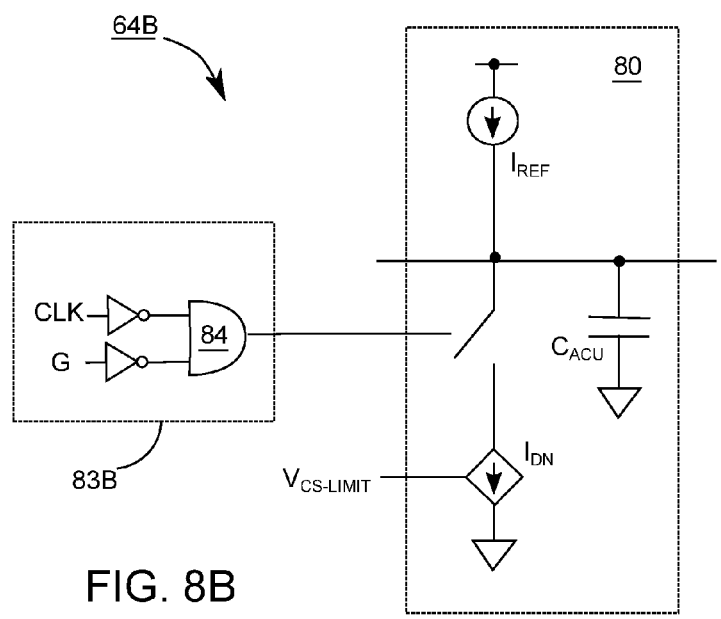

FIGS. 8A and 8B demonstrate two maximum output-current control units 64A and 64B respectively. The maximum output-current control unit 64A includes a modification circuit 83A and an apparatus 80 composed of a constant current source $I_{REF}$, a voltage-controlled current source $I_{DN}$, a switch and a capacitor $C_{ACU}$, where the signal $V_{CS\text{-}LIMIT}$ could be a variable depending on a compensation voltage $V_{COM}$, whose magnitude is controlled under the output voltage $V_{OUT}$. Teaching with regard to the apparatus 80 can be found from prior art such as US patent application 2014/0009977, which in FIG. 4 has the element 74 similar to the apparatus 80 of this specification. Based on the teaching of the prior art, if the modification circuit 83A in FIG. 8A does not exist, the magnitude of the constant current source $I_{REF}$ is one control parameter substantially determining the maximum output current of the output voltage $V_{OUT}$. The modification circuit 83A with a AND gate 82 and another constant current source $I_{TUNE}$, nevertheless, is configured to let the constant current source $I_{TUNE}$ joint with the constant charge source $I_{REF}$ only during the adjustment time $T_{LC}$. Increasing the adjustment time $T_{LC}$ makes more electric charge accumulated in the capacitor $C_{ACU}$, seemingly enlarging the magnitude of the constant current source $I_{REF}$, so the maximum output current of the output voltage $V_{OUT}$ increases. It is reminded the adjustment time $T_{LC}$ is in proportion to the inductance LP, so the modification circuit 83A makes the inductance LP and the maximum output current have a positive correlation between each other, to compensate the negative correlation between the maximum output current of the output voltage $V_{OUT}$ and the inductance LP, so the maximum output current could be independent from the inductance variation of the primary winding $L_P$.

Similarly, the maximum output-current control unit 64B includes a modification circuit 83B and the apparatus 80, configured to forbid the voltage-controlled current source $I_{DN}$ discharging the capacitor $C_{ACU}$ during the adjustment time $T_{LC}$. If the adjustment time $T_{LC}$ increases, the capacitor $C_{ACU}$ is less discharged within a switching cycle, seemingly enlarging the magnitude of the constant current source $I_{REF}$, so the maximum output current of the output voltage $V_{OUT}$ increases. The modification circuit 83B effectively makes the adjustment time $T_{LC}$ (a representative of the inductance LP) and the maximum output current have a positive correlation between each other, to compensate the negative correlation between the maximum output current of the output voltage $V_{OUT}$ and the inductance LP, so the maximum output current could be independent from the inductance variation of the primary winding $L_P$.

The OCP/OPP unit 66 in the output rating control unit 63 could apply the same idea used by the maximum output-current control unit 64A or 64B to compensate the impact caused by the inductance variation of the primary winding $L_P$. For example, it is supposed that the OCP/OPP unit 66 has a power control parameter capable of representing the maximum power delivered from the output voltage $V_{OUT}$ to the load 13, while the maximum power and the inductance LP of the primary winding $L_P$ in a prior art are found to have a positive correlation between each other if no compensation to the inductance variation is provided. The OCP/OPP unit 66 could be designed to make the power control parameter has a negative correlation with the adjustment time $T_{LC}$, so as to cancel or compensate that positive correlation between the maximum power and the inductance LP. Accordingly, the maximum output current could be independent from the inductance variation of the primary winding $L_P$.

FIG. 5 shows a high-voltage node HV forwarding the input voltage $V_{IN}$ to the control circuit 50, but this invention is not limited to. In another embodiment of this invention, information of the input voltage $V_{IN}$ could be obtained via the feedback node FB in FIG. 2. For example, a power controller could clamp the feedback node FB at 0V during an ON time $T_{ON}$ and the magnitude of the current flowing away from the power controller 14 can be recorded to represent the input voltage $V_{IN}$.

While the invention has been described by way of examples and in terms of preferred embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power supply control method suitable for compensating inductance variation of an inductive device in a power supply, where the power supply has a power switch controlling a winding current through the inductive device, and converts an input voltage into an output voltage, the power supply control method comprising:
   providing a sampling time within an ON time of the power switch, wherein the sampling time has a length substantially independent from the ON time, the input voltage and an inductance of the inductive device;
   sampling during the ON time a current-sense signal to hold a sample voltage after the sampling time, wherein the current-sense signal is a representative of the winding current; and
   controlling the power switch in response to the sample voltage so as to make the output voltage comply with an output rating.

2. The power supply control method of claim 1, wherein the step of controlling comprises:
   providing an adjustment time in an OFF time of the power switch in response to the sample voltage; and
   controlling the power switch in response to the adjustment time.

3. The power supply control method of claim 2, wherein the adjustment time has dependence upon the inductance, and substantially not upon the input voltage.

4. The power supply control method of claim 2, further comprising:
   using a first capacitor to determine the sample time; and
   using the first capacitor to determine the adjustment time.

5. The power supply control method of claim 4, wherein the first capacitor has a capacitance and the adjustment time has no dependence upon the capacitance.

6. The power supply control method of claim 4, comprising:
   converting the sample voltage into an exemplary current charging the first capacitor to generate a first capacitor voltage; and
   concluding the adjustment time when the first capacitor voltage exceeds a reference voltage.

7. The power supply control method of claim 6, wherein the reference voltage is substantially in proportion to the input voltage.

8. The power supply control method of claim 1, further comprising:
   providing a leading-edge-blanking time, during which the power switch is kept ON irrespective of the current-sense signal;
   wherein the leading-edge-blanking time ends earlier than the sampling time in a switching cycle.

9. A control circuit suitable for use in a power supply converting an input voltage into an output voltage, wherein the power supply includes a power controller controlling a power switch connected to an inductive device, and the control circuit is in the power controller and for compensating inductance variation of the inductive device, the control circuit comprising:
- a comparator with first and second inputs;
- a first capacitor connected to the first input, wherein the comparator is configured to provide a sampling time having a length substantially independent from an ON time of the power switch, the input voltage and an inductance of the inductive device;
- a sample-and-hold circuit for holding a sample voltage after the sampling time by sampling during the ON time a current-sense signal, a representative of a winding current through the inductive device; and
- an output rating control unit for controlling the power switch in response to the sample voltage, so as to make the output voltage comply with an output rating.

10. The control circuit of claim 9, further comprising:
- a voltage-to-current converter for generating an exemplary current in response to the sample voltage to charge the first capacitor;
- wherein the comparator and the first capacitor are configured during an OFF time of the power switch to provide an adjustment time, and the output rating control unit controls the power switch in response to the adjustment time.

11. The control circuit of claim 10, further comprising a multiplexer for selecting one of a predetermined voltage and a reference voltage to be connected to the second input, wherein the reference voltage is in proportion to the input voltage.

12. The control circuit of claim 10, further comprising a multiplexer for selecting one of a predetermined current and the exemplary current to charge the first capacitor.

13. The control circuit of claim 12, wherein the predetermined current determines the sampling time.

14. The control circuit of claim 12, wherein the exemplary current determines the adjustment time.

15. The control circuit of claim 10, wherein the first comparator is reset whenever the power switch is toggled.

16. The control circuit of claim 10, wherein the output rating control unit comprises:
- a second capacitor; and
- a current source for charging the second capacitor in response to the adjustment time;
- wherein the current source charges the second capacitor only during the adjustment time.

17. The control circuit of claim 10, wherein the output rating control unit comprises:
- a second capacitor; and
- a current source for discharging the second capacitor in response to the adjustment time;
- wherein the current source discharging the second capacitor is forbidden during the adjustment time.

18. The control circuit of claim 9, wherein the sample-and-hold circuit samples the current-sense signal to generate the sample voltage right after the sampling time within the ON time.

19. The power supply control method of claim 1, comprising:
- sampling the current-sense signal to generate the sample voltage right after the sampling time within the ON time.

* * * * *